July 27, 1943.　　C. W. LEGUILLON ET AL　　2,325,139
APPARATUS FOR MAKING STRIP MATERIAL
Filed Sept. 2, 1942　　3 Sheets-Sheet 1
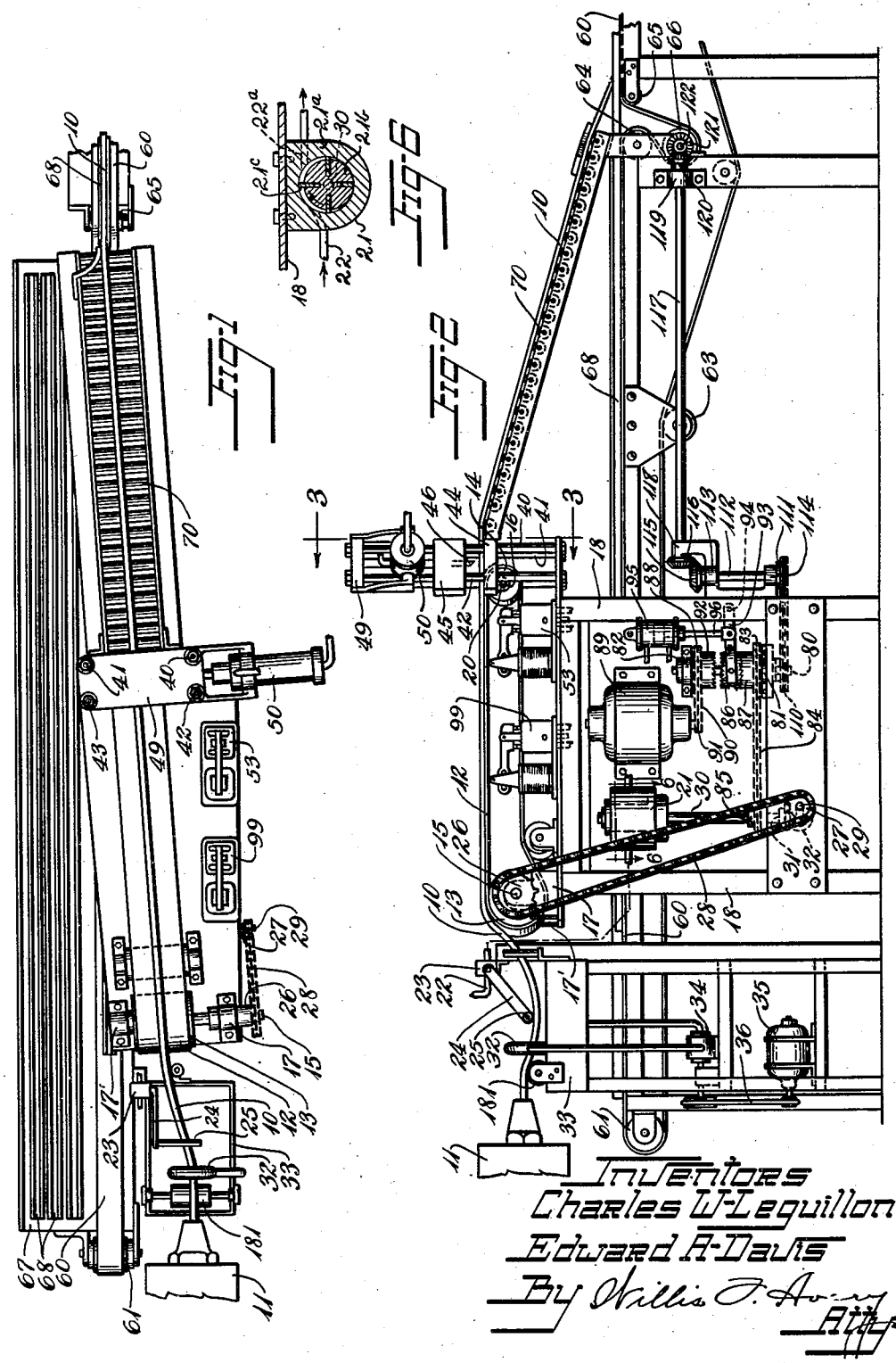
Inventors
Charles W. Leguillon
Edward A. Davis
By Willis J. Avery
Att'y

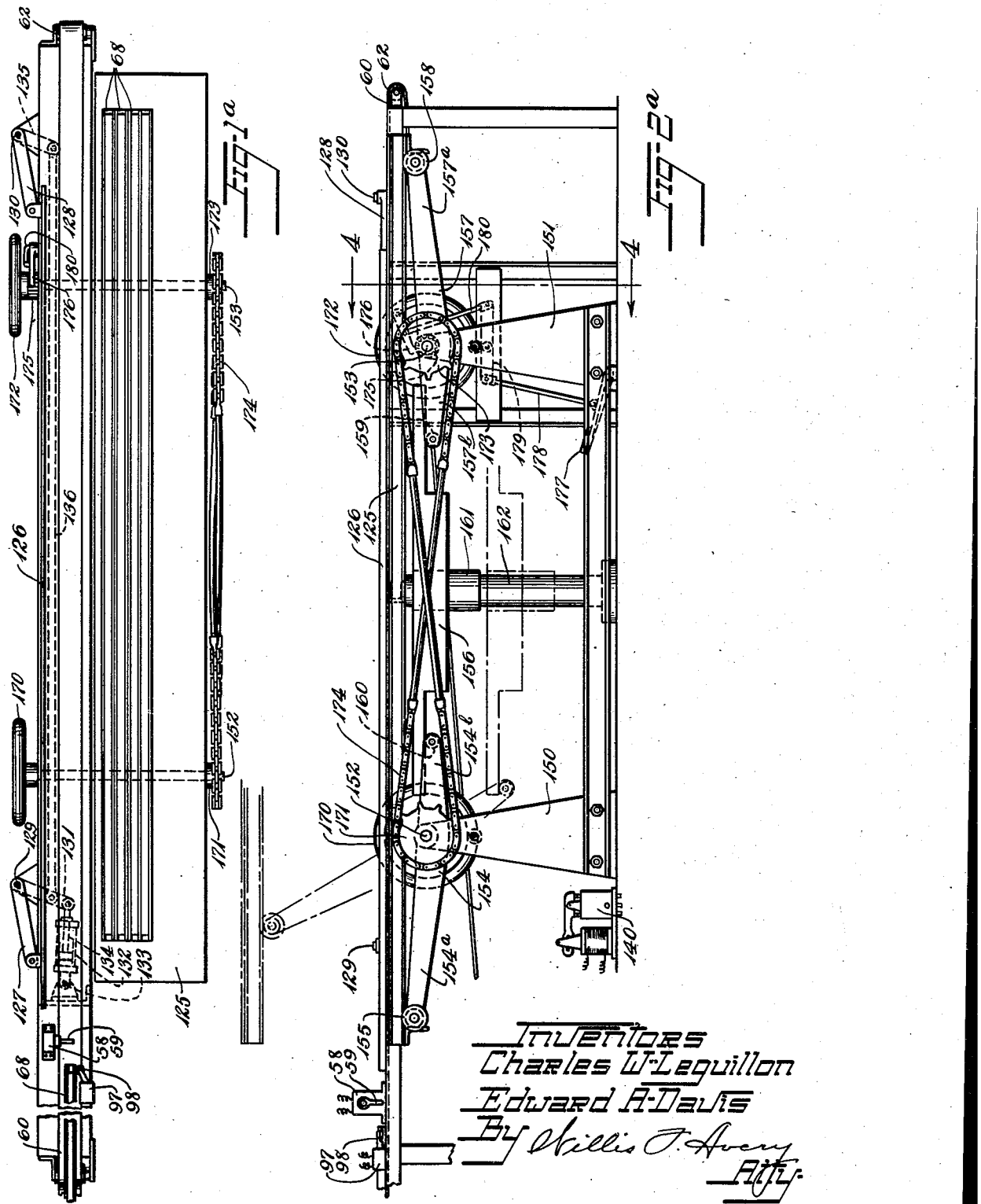

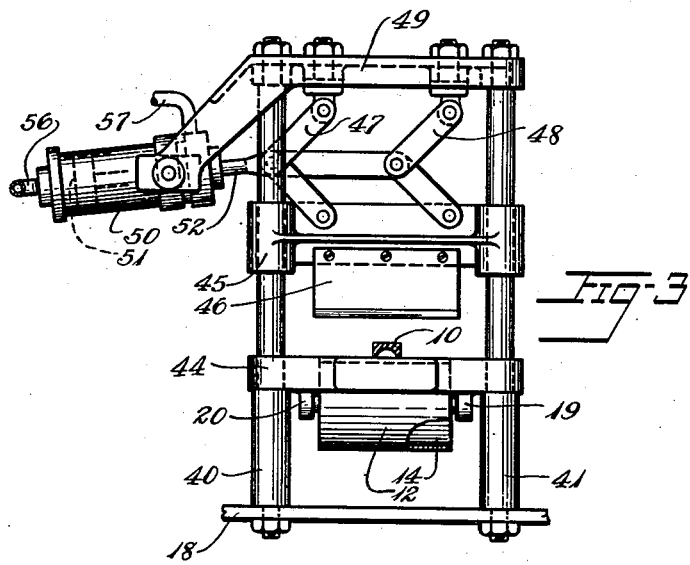
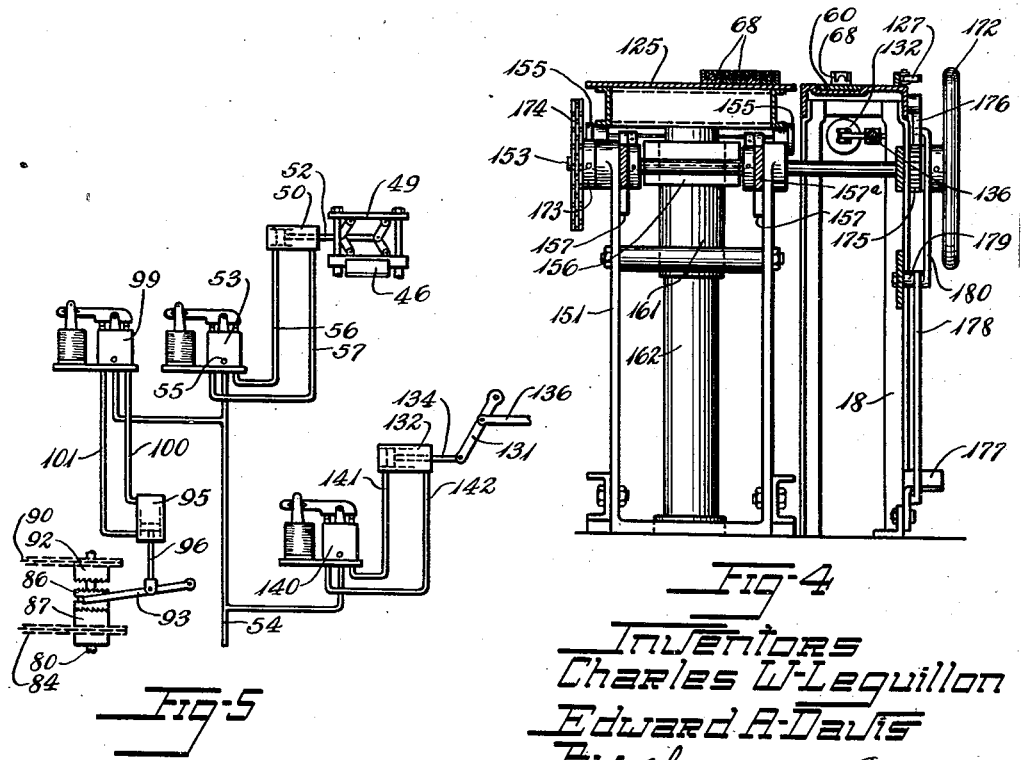

Patented July 27, 1943

2,325,139

UNITED STATES PATENT OFFICE 2,325,139

APPARATUS FOR MAKING STRIP MATERIAL

Charles W. Leguillon and Edward A. Davis, Akron, Ohio, assignors to The B. F. Goodrich Company, New York, N. Y., a corporation of New York Application September 2, 1942, Serial No. 456,986

6 Claims. (Cl. 164—49)

This invention relates to apparatus for making strip material and is especially useful in the manufacture of strips from extruded plastics such as unvulcanized rubber compositions.

In the manufacture of strips of rubber composition difficulties have been experienced in manufacture because of stretching of the plastic material due to handling as the soft material before vulcanization has little resistance to distortion and any change in length causes a corresponding change in cross-sectional dimensions.

Furthermore, as the plastic material is of an adhesive nature it has been found necessary to keep the strips separated from each other after the extruding operation and before vulcanization of the strips to avoid adhesion and to prevent distortion of the strips. Apparatus used heretofore for the production of such strips has necessitated considerable handling of the strips resulting in distortion and stretching thereof.

The present invention aims to overcome the foregoing and other difficulties and to provide a more nearly uniform product.

The principal objects of the invention are to avoid stretching of the extruded strip, to prevent distortion thereof, to provide strip material of substantially uniform length, to reduce waste, to provide automatic cutting to length, and generally to facilitate manufacture and provide a more nearly uniform product.

These and other objects will appear from the following description and the accompanying drawings.

Of the drawings,

Fig. 1 is a plan view of a part of an apparatus constructed in accordance with and embodying the invention.

Fig. 1a is a continuation thereof.

Fig. 2 is a side elevation of the apparatus.

Fig. 2a is a continuation thereof.

Fig. 3 is a sectional view taken on line 3—3 of Fig. 2 showing the cutting mechanism.

Fig. 4 is a sectional view taken on line 4—4 of Fig. 2a showing the transfer mechanism.

Fig. 5 is a detail diagram of the valves and piping.

Fig. 6 is a detail sectional view taken on line 6—6 of Fig. 2.

In the illustrated embodiment of the invention, plastic material is extruded onto a conveyor automatically synchronized in speed with the delivery speed of the extruded material and is automatically cut to length, an elongate, flexible, strip-supporting form is also conveyed at the delivery speed of the strip, the cut strips are guided to a position above the supporting form and progressively into position thereon, the speed of the form and the strip is accelerated intermittently to separate the successive lengths of strip material, and the forms with the strips thereon are moved laterally in succession to a transfer table which can be elevated or lowered to charge a vulcanizer or other apparatus with a set of forms carrying strips.

Referring to the drawings, the numeral 10 designates an extruded strip of plastic material, such as unvulcanized rubber composition. The strip is progressively formed by an extruding machine 11 and passes to a conveyor belt 12. The conveyor belt 12 is trained about pulleys 13, 14 fixed to parallel shafts 15, 16 respectively. Shaft 15 is rotatably mounted in bearings 17, 17' supported by a frame 18. Shaft 16 is rotatably supported from the frame 18 by bearings 19, 20.

The conveyor belt 12 is arranged to be driven in synchronism with the speed of delivery of the strip, and for this purpose a compressed-air-operated motor 21 is mounted on frame 18 and is supplied with compressed air from any convenient source (not shown) such as an air compressor, through a pipe 22. The motor comprises a stationary casing 21a having a cylindrical chamber in which a rotor 21b is rotatably and eccentrically mounted. Pipe 22 connects tangentially with the chamber and an exhaust port 22a is provided connecting with the chamber. Blades 21c are slidably mounted in radial slots of the motor and are held radially against the cylinder wall by springs (not shown) and by centrifugal force. Air entering the motor through pipe 22 causes the rotor 21b to rotate and the expanded air is exhausted at 22a. A valve 23 in the pipe has an operating arm 24 carrying a roller 25 which rests by gravity on a free reach of the strip between the extruder 11 and the conveyor 12. Shaft 15 has a sprocket 26 fixed thereto and is driven by a sprocket 27 and chain 28. Sprocket 27 is fixed to a shaft 29 rotatably supported in bearings on frame 18. Air motor 21 has a shaft 30 which has a bevel gear 31 fixed thereto in a position to drive a bevel gear 32 fixed to shaft 29. The arrangement is such that when the reach of the strip, which normally sags somewhat, drops below its normal position, valve 23 is opened further and speeds up motor 21 and conveyor 12, and when the strip rises too high the valve 23 is closed which slows the conveyor 12.

For treating the strip to prevent its sticking to other material and to prevent portions of the strip sticking together, the reach of strip 10 between the extruder 11 and the conveyor 12 passes through a spray loop 32 and over a tank 33 containing a dispersion of soapstone, graphite, mica, or other lubricating material. A pump 34 driven by a motor 35 through a belt 36 supplies the spray ring with dispersion from tank 33 so that the strip is coated with the dispersion.

For cutting the strip in determinate lengths, vertically disposed guide rods 40, 41, 42, 43 (see Fig. 3) are mounted on the frame 18. An anvil 44 is supported by the rods at the delivery end of conveyor belt 12 and beneath the path of the strip 10. A cross head 45 is slidably mounted on the guide rods and carries a knife 46 adapted to cut against the anvil. Sets of toggle levers 47, 48 support the cross head from a cross-bar 49 fixed to the guide rods. A double acting fluid pressure cylinder 50 is fixed to cross-bar 49 and its piston 51 is fixed to a piston rod 52 and is pivotally connected to the toggle levers. The arrangement is such that in a full stroke of the piston in either direction the knife 46 is lowered into contact with the anvil and then raised as the toggle arms pass over dead centers.

For operating the piston 51 in the cylinder 50, a four-way "Ross" solenoid-operated valve 53 is provided with a supply line 54, and an exhaust opening 55. Pipes 56, 57, connect the valve 53 with opposite ends of cylinder 50 for reversing the movement of said piston therein. Mounted in the path of the strip 10 is an electrical circuit closing mechanism 58 (see Figs. 1a and 2a) of the ratchet-operated sequence relay type. Its ratchet arm 59 normally hangs in the path of the strip and when deflected therefrom by the leading ends of strips closes the circuit to solenoid valve 53, reversing the circuit each time so that air is supplied first to one end of cylinder 50 and then to the other end thereof to sever the strip 10 as its leading end strikes the arm 59.

To provide for supporting the strips against stretch during handling and to keep them in shape during vulcanization, a conveyor belt 60 is trained about a pulley 61 near the extruder, and a pulley 62 spaced therefrom. Other guide pulleys 63, 64 and 65 are provided to guide the belt and a loop of the belt is trained about a drive pulley 66. A table 67 is provided adjacent the upper reach of the belt to support a plurality of flexible and substantially non-extensible strip forms or supports 68. A roller conveyor 70 extends beyond conveyor belt 12 to support the strip 10 with minimum friction, and to deliver it to the belt 60 which is non-parallel thereto in both horizontal and vertical planes, the arrangement being such that belt 60 conveys a strip form 68 below the descending strip 10 on the inclined conveyor 70. The strip forms are advanced from the table 67 to the belt 60 by an operator and the cut strip 10 descends along conveyor 70 onto the form.

Belt 60 is normally driven at the same speed as conveyor 12 as follows: A jack shaft 80 (see Fig. 2) is rotatably mounted in bearings 81, 82 on frame 18. A sprocket 83 is rotatably mounted on the jack shaft and is driven by a chain 84 from a sprocket 85 fixed to the shaft 30 of air motor 21. A clutch member 86 is slidably mounted on jack shaft 80 and keyed thereto against rotation and normally engages a clutch member 87 fixed to sprocket 83. The clutch members are of the ratchet jaw type.

For accelerating the speed of the conveyor 60 to space a cut strip forward from the succeeding strip material, a sprocket wheel 88 is rotatably mounted on the jack shaft and is driven by an electric motor 89 through a chain 90 and a sprocket 91 fixed to the motor shaft. A ratchet jaw clutch member 92 is fixed to sprocket 88 and is engageable with the sliding clutch member 86 which has ratchet jaw teeth on its opposite ends. A shifter fork 93 is pivoted at 94 on frame 18. A double acting fluid pressure cylinder 95 is pivoted to frame 18 and its piston rod 96 is pivoted to the shifter fork. An electrical limit switch 97 has a roller arm 98 located along conveyor belt 60 in the path of the strip supporting form 68. When the switch arm is undisturbed its circuit is closed and energizes the solenoid of a four-way "Ross" valve 99 which supplies compressed air from pipe line 54 to the top end of cylinder 95 through pipe 100 causing the clutch member 86 to engage sprocket 83 so that motor 21 drives the jack shaft 80 and conveyor 60, but when arm 98 is deflected by a former 68 passing it, it reverses the current to the solenoid of valve 99 shifting the valve to supply compressed air to the bottom end of cylinder 95 through pipe 101 disengaging the clutch member 86 from sprocket 83 and engaging it with sprocket 88 so that jack shaft 80 is driven at a higher speed. Jack shaft 80 drives pulley 66 which in turn drives conveyor belt 60 as follows: A sprocket 110 is fixed to shaft 80. A sprocket 111 is fixed to a shaft 112 journaled in bearings 113, 114 on frame 18. Shaft 112 also has a bevel gear 115 fixed thereto in a position to mesh with a bevel gear 116 fixed to a shaft 117. Shaft 117 is journaled in bearings 118, 119, fixed to frame 18. A bevel gear 120 is also fixed to shaft 117 in a position to engage a bevel gear 121 fixed to a shaft 122 to which pulley 66 is secured. This arrangement of gearing permits the arrangement of conveyors 12 and 60 in non-parallel relation while driving them from a single power source thereby facilitating delivery of the strip and the form at a single station for assembly.

Means is provided for discharging the form 68 with the strip material thereon laterally from belt 60 to a transfer table 125. For this purpose, a movable fence 126 is pivotally mounted on parallel arms 127, 128, fixed to vertical shafts 129, 130 journaled on frame 18. An arm 131 is fixed to shaft 129. A double-acting fluid pressure-operated cylinder 132 is pivotally mounted on frame 18 at 133 and its piston rod 134 is pivotally connected to arm 131. Arm 131 is also pivotally connected to an arm 135 fixed to shaft 130, by a link 136. The arrangement is such that the fence 126 always moves parallel to belt 60 under influence of cylinder 132. Cylinder 132 is controlled by a four-way solenoid operated "Ross" valve 140, the solenoid of which is controlled by limit switch 97. The arrangement is such that when arm 98 is not deflected by the former 68 the valve 140 admits compressed air from line 54 through a pipe 141 to the left end of the cylinder, as seen in Fig. 1a, and the opposite end is opened to exhaust through pipe 142 thereby holding the fence 126 in advanced position. As the leading end of the form 68 deflects the arm 98 air under pressure is admitted to the right end of cylinder 132, as seen in Fig. 1a, through pipe 142 and the left end of the cylinder 132 is opened to exhaust through pipe 141 causing the fence to be withdrawn until the trailing end of the form passes and releases the arm 98 whereupon the fence advances and pushes the form laterally of the belt 60 onto table 125.

The table 125 is capable of being raised or lowered to and from its receiving position or level to transfer one or more forms and their strips to a vulcanizer or storage truck. For this purpose, a pair of pedestals 150, 151 are mounted below the table 125 and have bearings at their upper portions for receiving parallel shafts 152, 153. A lever 154 is fixed to shaft 152 and has a long arm 154a provided at its extremity with a flanged roller 155 for engaging the under side of the table, and a short arm 154b having a roller 160 at its free end for engaging under a counterweight 156. A similar lever 157 has a long arm 157a having a flanged roller 158 for engaging the table 125, and a short arm 157b having a roller 159 for engaging under a counter weight 156. Counter weight 156 has a cylinder 161 attached to the center of its lower face and adapted to slide over a post 162 fixed to the floor between pedestals 150 and 151. Shaft 152 has a hand wheel 170 and a sprocket 171 fixed thereto, and shaft 153 has a similar hand wheel 172 and a similar sprocket 173 fixed thereto. Sprockets 171 and 173 are connected by a crossed chain 174. The arrangement is such that by rotating either hand wheel 170 or 172 the levers 154, 157 are swung in a rotative movement toward or from each other. Movement toward each other raises table 125 and movement in the opposite direction lowers it.

To hold the table at the desired level, a ratchet wheel 175 is fixed to shaft 153. A pawl 176 is pivoted on frame 18 and gravitationally engages the ratchet to lock the shaft against rotation in clockwise direction as seen in Fig. 2a.

For releasing the pawl, a pedal 177 is pivotally mounted on frame 18 and is connected by a link 178, a lever 179, and a link 180 to the pawl 176. The arrangement is such that by depressing the pedal 177 the pawl 176 is raised, relieving the ratchet wheel.

The operation of the apparatus is as follows: A plurality of flexible channel shaped forms 68 are stacked on table 67. Plastic material, such as unvulcanized rubber composition is fed through extruder 11 to form progressively a plastic strip 10 of the desired cross-section and the leading end of the strip is threaded over a guide roller 181 through the spray loop 32 and under roller 25 onto conveyor 12. The speed of conveyor 12 is automatically regulated by the sag of the reach of strip material under roller 25. The leading end of the strip follows conveyor 12 and then over anvil 44 under knife 46 and then down conveyor 70. An operator stands at table 67 and manually advances one of the forms 68 onto conveyor 60 watching the advance of strip 10 and timing release of the former to the belt so that its leading end and the leading end of strip 10 are equally advanced. The conveyor 60 and the conveyor 12 are at this time operating at the same speed. As the leading end of the strip 10 strikes the arm 59 of the sequence relay 58 the knife descends and severs the strip and immediately returns to its elevated position. The severed portion of the strip and the form 68 are then advanced at a more rapid speed due to deflection of arm 98 of limit switch 97 and under the power of motor 89 while the succeeding strip material continues to advance over conveyor 12 at the speed of delivery of the extruder. As the trailing end of the form 68 leaves the limit switch 97, arm 98 returns to its normal position, conveyor 60 is slowed to the speed of conveyor 12 and the form with the strip thereon is moved laterally of belt 60 by the fence 126 to a position on the table 125. When the table 125 becomes loaded with forms carrying strips, the table may be raised to level it with a truck or other apparatus to which the forms and strips are to be delivered.

By use of the apparatus of the invention unnecessary stretching and distortion of the strip material is avoided and a more nearly uniform product is produced with less waste of material.

Variations may be made without departing from the spirit of the invention as it is defined by the following claims.

I claim:

1. In apparatus for making determinate lengths of plastic strip material including means for advancing the material endwise in strip form and means for severing predetermined lengths in succession from the advancing material, the combination of means for feeding a supporting form beneath the strip material in the same general direction as that of the advance of said material and into supporting relation with the leading end of the strip material, and means for accelerating the speed of the supporting form and a severed length of strip material thereon to space said length from the unsevered strip material.

2. In apparatus for making determinate lengths of plastic strip material including means for advancing the material endwise in strip form and means for severing predetermined lengths in succession from the advancing material, the combination of means for feeding a supporting form beneath the strip material in the same general direction as that of the advance of said material and into supporting relation with the leading end of the strip material, means for accelerating the speed of the supporting form and a severed length of strip material thereon to space said length from the unsevered strip material, and means for shifting the supporting form and the severed strip supported thereby laterally out of the path of succeeding forms and strips.

3. In apparatus for making determinate lengths of plastic strip material including means for advancing the material endwise in strip form and means for severing predetermined lengths in succession from the advancing material, the combination of means for feeding a supporting form beneath the strip material in the same general direction as that of the advance of said material and into supporting relation with the leading end of the strip material, means for accelerating the speed of the supporting form and a severed length of strip material thereon to space said length from the unsevered strip material, and means controlled by the arrival of the leading end of the strip at a determinate position for shifting the supporting form and the severed strip supported thereby laterally out of the path of succeeding forms and strips.

4. In apparatus for making determinate lengths of plastic strip material including means for advancing the material endwise in strip form and means for severing predetermined lengths in succession from the advancing material, the combination of means for feeding a supporting form beneath the strip material in the same general direction as that of the advance of said material and into supporting relation with the leading end of the strip material, means for accelerating the speed of the supporting form and a severed length of strip material thereon to space said length from the unsevered strip material, means controlled by the arrival of the leading end of the strip at a determinate position for shifting the supporting forms and the severed strips thereon in succession laterally out of the path of succeeding forms and strips onto a table, and means for elevating and lowering the table to various discharging levels.

5. In apparatus for making determinate lengths of plastic strip material, means for advancing the material endwise in strip form, means for feeding a supporting form beneath the strip material in the same general direction as that of the strip material and into supporting relation with the leading end of the strip material at the same speed as the speed of advance of said material, means for severing a predetermined length of the material from the advancing strip, and means for accelerating the speed of the supporting form and the severed length of the strip material thereon to space said length from the unsevered strip material.

6. In apparatus for making determinate lengths of plastic strip material including means for advancing the material endwise in strip form and means for severing predetermined lengths in succession from the advancing material, the combination of means for feeding supporting forms in succession beneath the strip material in the same general direction as that of the advance of said material and into supporting relation with successive cut lengths of said material.

CHARLES W. LEGUILLON.
EDWARD A. DAVIS.